2 Sheets--Sheet 1.
W. SAGER.
Heating and Ventilating Railroad Cars.
No. 166,415. Patented Aug. 3, 1875.
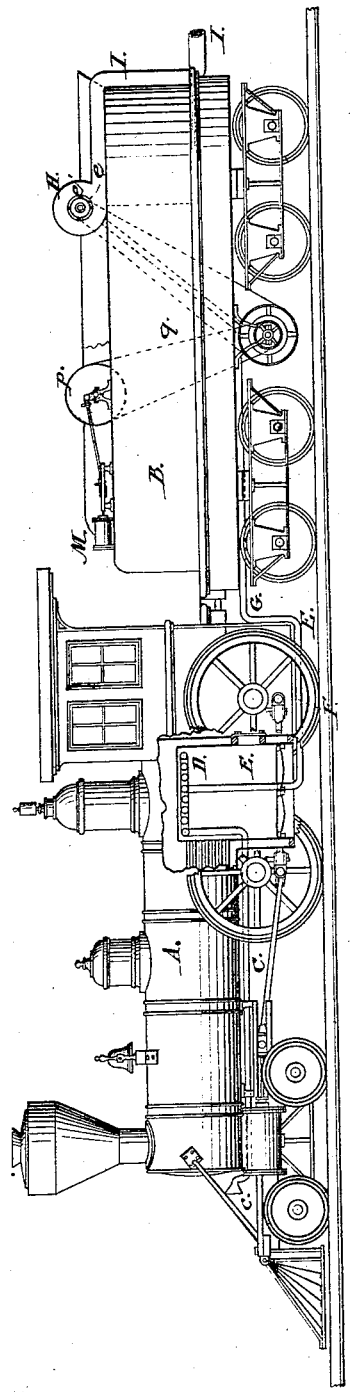
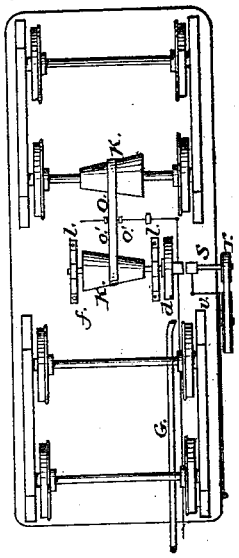
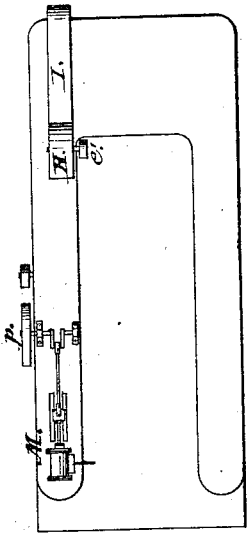
Witnesses:
Ed. E. Greenleaf
Chas. A. Greenleaf
Inventor:
Wellington Sager 2 Sheets--Sheet 2.

W. SAGER.
Heating and Ventilating Railroad Cars.

No. 166,415.  Patented Aug. 3, 1875.

Witnesses:  Inventor:

UNITED STATES PATENT OFFICE.

WELLINGTON SAGER, OF COLCHESTER, VERMONT.

IMPROVEMENT IN HEATING AND VENTILATING RAILROAD-CARS.

Specification forming part of Letters Patent No. 166,415, dated August 3, 1875; application filed December 2, 1874.

*To all whom it may concern:*

Be it known that I, WELLINGTON SAGER, of Colchester, in the county of Chittenden and State of Vermont, have invented certain new and useful Improvements in Method of Heating and Ventilating Railway-Cars; and I do hereby declare the following to be a full, clear, and exact description of the invention, such as will enable others skilled in the art to which it pertains to make and use it, reference being had to the accompanying drawings, which form part of this specification.

My invention relates to the heating and ventilating of railway-cars; and it consists in conveying heated or cold air to the interior of the cars through a pipe suspended under the locomotive and tender, which conveys the air to a fan placed on the tender, the rotation of which creates a current and expels the air into pipes placed under the cars, from whence it reaches the interior through branch pipes opening into registers. For heating purposes the air is made to pass through a coil of pipe in the fire-box of the locomotive connected with the supply-pipe; but for ventilating purposes the supply-pipe is disconnected from the coil, and the air supplied directly to the cars, or cooled by being passed through coils surrounded by ice contained in boxes under the cars.

Figure 4:
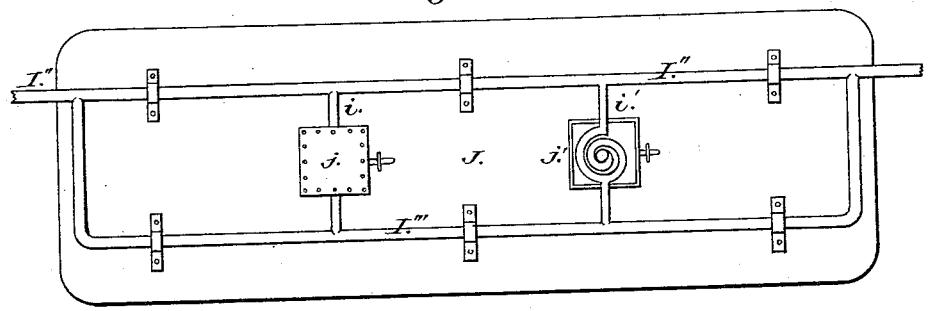
Figure 5:
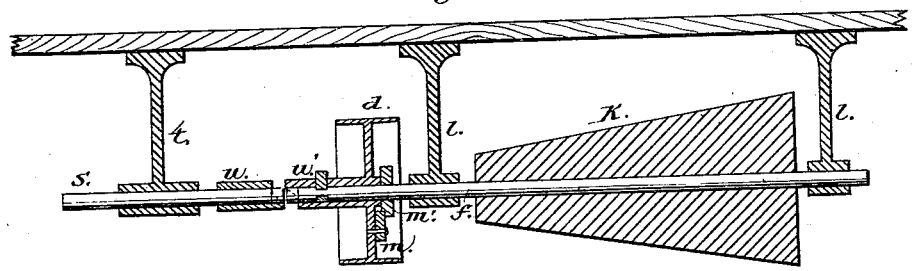
Figure 6:
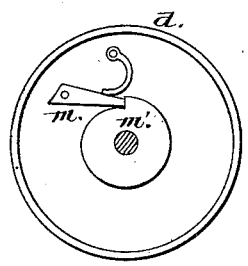

Figure 1 is an elevation of the locomotive and tender. Fig. 2 is a plan of the top of the tender, showing the small engine and fan. Fig. 3 is a plan of the bottom of the tender, showing the mechanism for driving the fan. Fig. 4 is a plan of the bottom of a car provided with pipes for supplying air. Fig. 5 is a section through the line $x\,x$, showing the fan-driving devices. Fig. 6 is an elevation of the loose pulley.

A is the locomotive. B is the tender. C is the air-pipe suspended under the locomotive. This pipe is provided with a bell-shaped mouth, $c$, which opens to the front of the locomotive, as shown. D is a coil of pipe within the fire-box E, the ends of which project out of the box, one being connected with the pipe C, and the other with the pipe F, suspended under the cab, which forms a continuation of pipe C. Pipe F is coupled to a similar pipe, G, suspended under the tender, which passes up through the tender, and terminates or opens into the fan-box H. From the fan-box a pipe, I, extends to the rear of the tender, and is carried down sufficiently low to couple with a pipe, I'', suspended under the floor J of the car following the tender. The pipe I'' may be a single pipe, or it may be provided with a branch, I''', when it is required to supply a large quantity of heated or cold air to the interior of the car, and similar pipes are to be connected with each car, so that when coupled together the air received into the pipe or locomotive may be circulated through the whole train. Pipe I'' is provided with branches $i\,i'$, which enter the boxes $j\,j'$, attached to the bottom of the car, where they form several convolutions, and then open into registers. The boxes $j\,j'$ are designed to hold ice when cold air is supplied to the cars, but when warm air is required they may be packed with some non-conducting material. For heating the cars the pipes C and F are coupled to the coil D. The air entering the pipe C is heated in passing through the coil. It then passes through pipes F and G to the fan-box H, thence it is expelled by the fan through pipe I into pipe I'', from whence it finds its way to the interior of the car through branches $i\,i'$. When, however, it is desired to supply cold air to the cars, the pipes C and F are detached from the coil D, and spliced together by a short pipe, so that the air which passes through the pipes to the cars is not increased in temperature. The current necessary to force the air through the cars is partly derived from the forward motion of the locomotive, which causes it to enter the mouth $c$ of pipe C, for which its shape and position peculiarly adapt it, and partly from the rotation of the fan, which, by driving the air into the cars, creates a vacuum, which has to be filled from the exterior by the pipe C. As it is necessary to supply the cars with air while at a stand-still, as well as when running, the fan is kept at work at all times by a device which I will now describe. The shaft $e$ of the fan is provided with a pulley, $e'$, which is geared by a working-belt with the loose pulley $d$ on shaft $f$, journaled in hangers $l\,l$, attached to the bottom of the car. Pulley $d$ is loose on the shaft, but it is provided with a spring-pawl, $m$, which engages a chuck, $m'$, fixed to the shaft $f$, so that while the pulley can be rotated independently of the shaft $f$, the latter, when rotated in the same direction, necessarily carries the pulley with it. K K are conical pulleys, one fixed to the shaft $f$, and the other to one of the axles of the tender. They are geared together by the belt O, so that whenever the tender moves the motion is communicated to the fan through the mechanism described. In order that the variable speed of the locomotive may be rendered invariable for the regular motion of the fan the belt O may be shifted about on the conical pulleys by the guides $o'\ o'$, actuated by levers from the upper part of the tender.

By this arrangement the fan may be kept continually in motion while the locomotive is running; but to supply the power when the train is at a stand-still I employ a small auxiliary engine, M, placed upon the tender, which is supplied with steam from the locomotive-boiler. The driving-wheel $p$ of this engine is geared by belt $q$, passing outside the tender, to the pulley $r$, fixed to the short shaft $s$, journaled in the hanger $t$. This shaft is provided with a clutch, $u$, which engages a clutch, $u'$, which forms a part of the pulley $d$. The clutch $u$ is operated to engage or disengage the clutch $u'$ by a lever, $v$, extending up to the top of the tender, from whence it is operated. When the locomotive is not running the clutch $u$ is made to engage the pulley $d$, and when the small engine is started the pulley is rotated, which thus operates the fan.

By the arrangements here described the fan may be kept in continuous operation, and the cars supplied with hot or cold air at all times and in adequate quantities.

I am aware that pipes and coils for heating air for cars have been placed around the fire-box, and also in the lower part thereof, so as to be covered by the fuel; but both of these methods have been found defective—the first on account of the inadequacy of the heat communicated to the air in the pipes, and the latter on account of the pipes or coils occupying too much space, and thereby decreasing the body of the fuel, and also interfering with the proper stoking of the fire. In my invention the coil is placed in the upper part of the fire-chamber, out of the way of the fire, and in a position to receive enough heat from the fire to properly heat the air, and at the same time does not perceptibly diminish the steam-generating surface of the boiler.

Having thus described my invention, what I claim as new, and desire to secure by Letters Patent, is—

The combination of the induction-pipe C, coil D, placed in the fire-chamber above the fire, as described, pipes F and G, fan H, pipe I, and a system of pipes and registers under the cars, to supply heated air to the interior thereof, substantially as and for the purpose hereinbefore described and set forth.

In testimony that I claim the foregoing I have hereunto set my hand and seal this 26th day of October, 1874.

WELLINGTON SAGER. [L. S.]

Witnesses:
ED. E. GREENLEAF,
CHAS. A. GREENLEAF.